(12) United States Patent
Hiramatsu

(10) Patent No.: US 10,960,742 B2
(45) Date of Patent: Mar. 30, 2021

(54) MANUFACTURING METHOD OF SUNROOF APPARATUS

(71) Applicant: AISIN SEIKI KABUSHIKI KAISHA, Kariya (JP)

(72) Inventor: Shinichi Hiramatsu, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 195 days.

(21) Appl. No.: 16/369,444

(22) Filed: Mar. 29, 2019

(65) Prior Publication Data

US 2019/0299761 A1 Oct. 3, 2019

(30) Foreign Application Priority Data

Mar. 30, 2018 (JP) .............................. JP2018-066362

(51) Int. Cl.
| | |
|---|---|
| *B60J 7/043* | (2006.01) |
| *B60J 7/057* | (2006.01) |
| *B21D 53/88* | (2006.01) |
| *B60J 7/00* | (2006.01) |
| *E05F 15/655* | (2015.01) |

(52) U.S. Cl.
CPC ............ *B60J 7/0435* (2013.01); *B21D 53/88* (2013.01); *B60J 7/043* (2013.01); *B60J 7/0573* (2013.01); *B60J 7/0015* (2013.01); *B60J 7/057* (2013.01); *E05F 15/655* (2015.01); *E05Y 2900/542* (2013.01)

(58) Field of Classification Search
CPC ......... B21D 53/88; B60J 7/0015; B60J 7/043; B60J 7/0435; B60J 7/057; B60J 7/0573; E05Y 2900/542
See application file for complete search history.

(56) References Cited

U.S. PATENT DOCUMENTS

| | | | |
|---|---|---|---|
| 7,850,230 B2 | 12/2010 | Faerber | |
| 2003/0107245 A1* | 6/2003 | Funahashi | ................ B60J 7/022 296/223 |
| 2006/0284450 A1* | 12/2006 | Regnier | ................... B60J 7/024 296/216.01 |
| 2008/0083518 A1* | 4/2008 | Sadornil Santamaria | ................... B60J 7/0015 160/370.21 |

(Continued)

FOREIGN PATENT DOCUMENTS

| | | |
|---|---|---|
| CN | 204432331 U | 7/2015 |
| DE | 10 2005 030 055 A1 | 12/2006 |

*Primary Examiner* — Jermie E Cozart
(74) *Attorney, Agent, or Firm* — Finnegan, Henderson, Farabow, Garrett & Dunner, LLP

(57) ABSTRACT

A manufacturing method of a sunroof apparatus includes a panel drive unit including a first guide rail arranged at each end portion of a roof opening portion, a panel support member configured to displace a movable panel to open and close the roof opening portion in accordance with a movement of a first moving portion, and a shade unit including a second guide rail arranged inward relative to the first guide rail in the vehicle width direction. The first guide rail and the second guide rail are separately provided. The manufacturing method of the sunroof apparatus includes a first process connecting the movable panel to the panel support member, and a second process connecting the first guide rail and the second guide rail to the movable panel after the first process.

1 Claim, 11 Drawing Sheets

(56) References Cited

U.S. PATENT DOCUMENTS

| | | | |
|---|---|---|---|
| 2010/0066130 A1* | 3/2010 | Rashidy | B60J 7/0435 296/216.08 |
| 2014/0049100 A1* | 2/2014 | Iwaya | B60R 16/0237 307/9.1 |
| 2015/0048655 A1* | 2/2015 | Heidan | B60J 7/024 296/220.01 |
| 2016/0121702 A1* | 5/2016 | Bojanowski | B62D 65/026 29/426.2 |

* cited by examiner

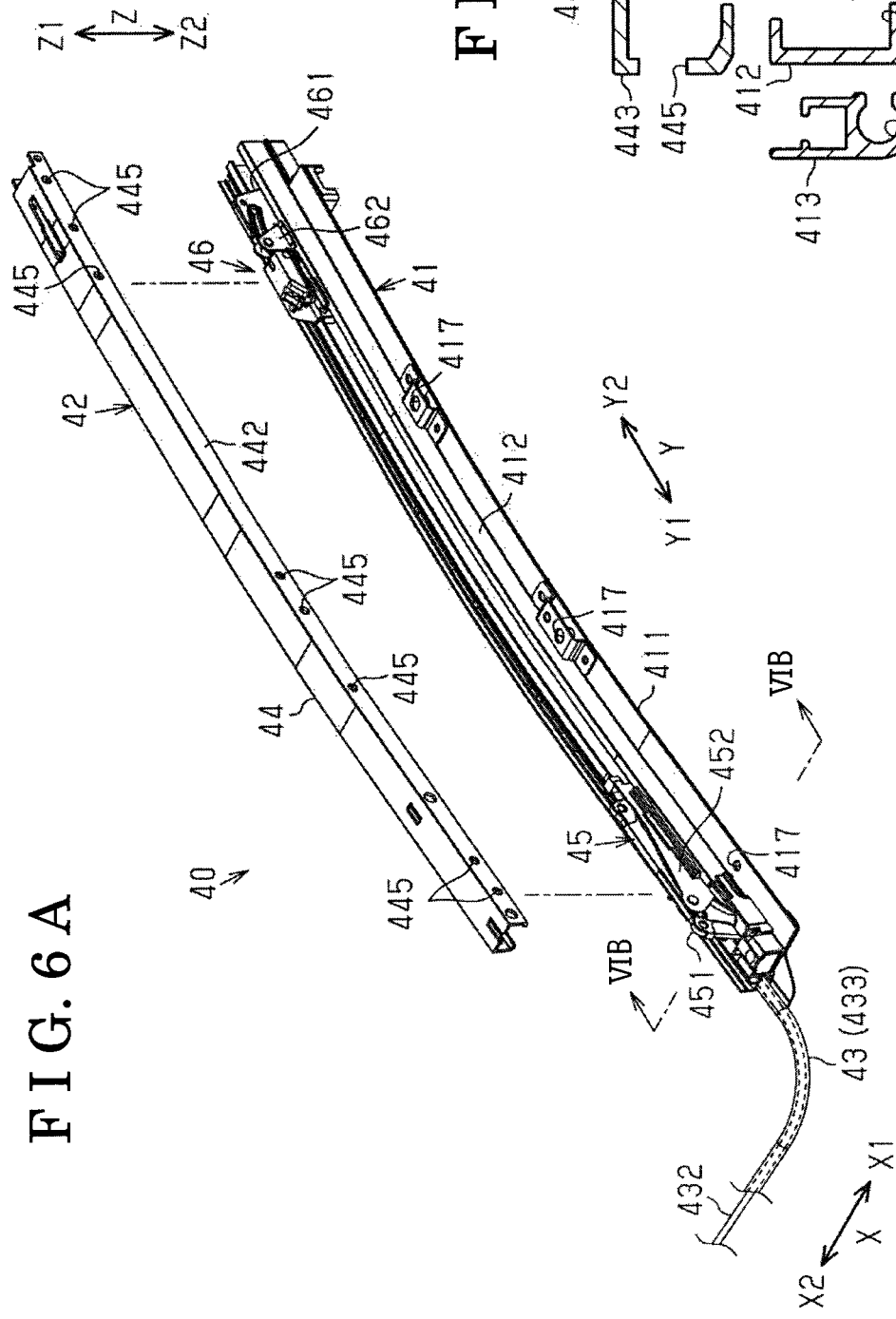
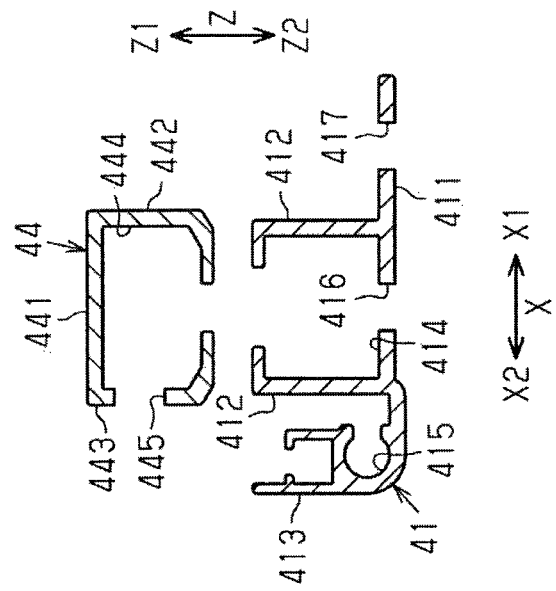
FIG. 6A
FIG. 6B

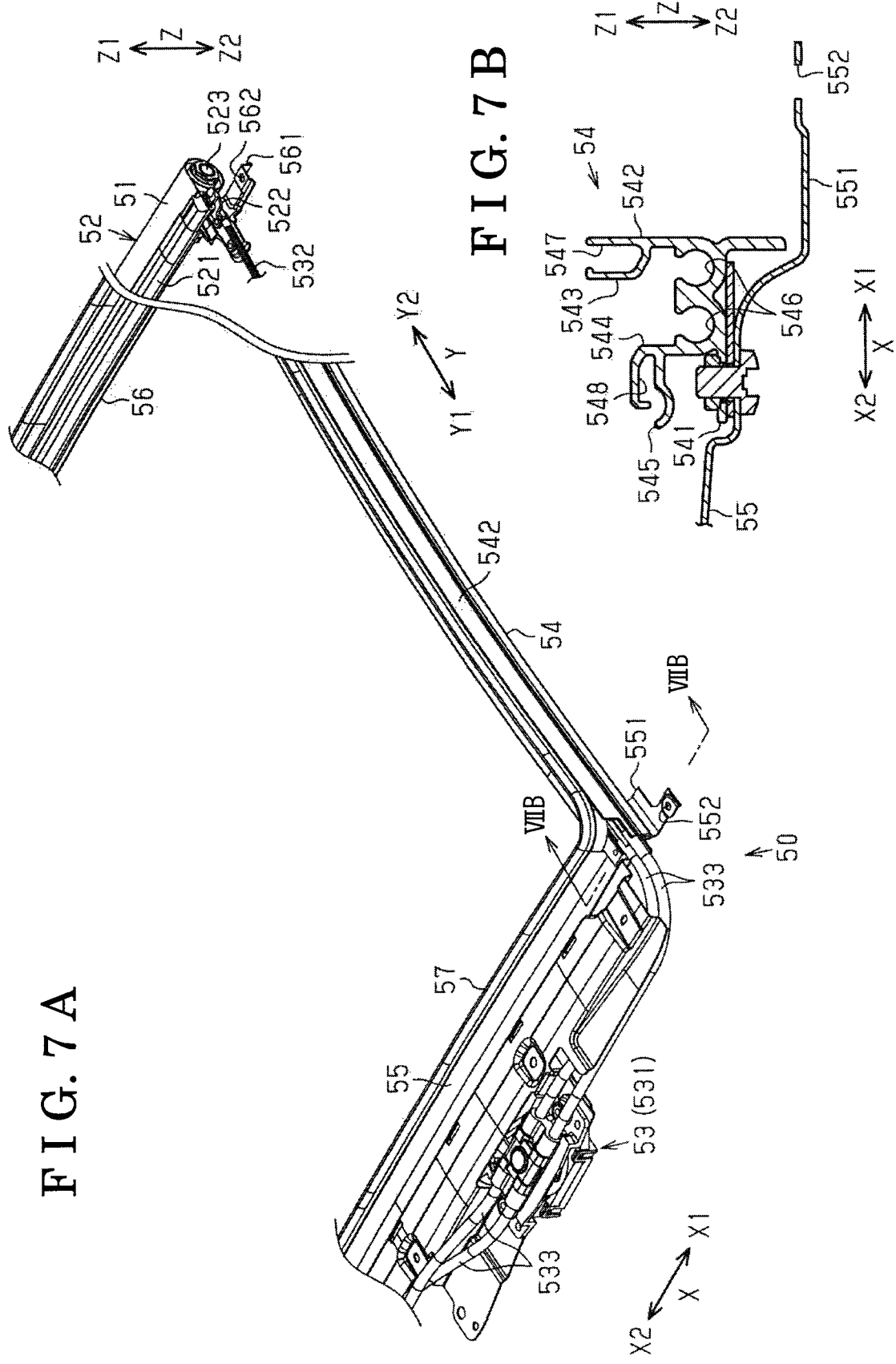

MANUFACTURING METHOD OF SUNROOF APPARATUS

CROSS REFERENCE TO RELATED APPLICATIONS

This application is based on and claims priority under 35 U.S.C. § 119 to Japanese Patent Application 2018-066362, filed on Mar. 30, 2018, the entire content of which is incorporated herein by reference.

TECHNICAL FIELD

This disclosure generally relates to a manufacturing method of a sunroof apparatus.

BACKGROUND DISCUSSION

A known sunroof apparatus including a movable panel and a roller blind is disclosed in in DE102005030055A (hereinafter referred to as Patent reference 1). The movable panel disclosed in Patent reference 1 moves between an opening position where a roof opening portion is opened and a closing position where the roof opening portion is closed. The roller blind moves between an extended position where the roller blind extends so that light penetrating the movable panel does not reach a vehicle compartment, and a retracted position where the roller blind is retracted so that the light penetrating the movable panel reaches the vehicle compartment.

The sunroof apparatus disclosed in Patent reference 1 includes a guide rail, a first moving portion, a second moving portion, and a panel support member. The guide rail extends in a vehicle front-rear direction. The first moving portion and the second moving portion move along the guide rail. The panel support member supports the movable panel and is supported by the first moving portion. The panel support member is displaced such that the movable panel moves between the opening position and the closing position in response to the movement of the first moving portion in the vehicle front-rear direction. The roller blind moves between the extended position and the retracted position in response to the movement of the second moving portion in the vehicle front-rear direction.

According to the sunroof apparatus disclosed in Patent reference 1, the guide rail is formed such that a groove on which the first moving portion moves and a groove on which the second moving portion moves are arranged next to each other in a vehicle width direction. Accordingly, depending on the shape of a wall portion defining the groove on which the first moving portion moves and the groove on which the second moving portion moves, the wall portion may be an obstacle when the movable panel is fixed on the panel support member.

For example, in a case where a tool for fixing the movable panel to the panel support member interferes with the wall portion, a fixing portion has to be exposed from the wall portion to the extent where the tool reaches the fixing portion fixing the movable panel and the panel support member. That is, in this case, the wall portion is required to include a cutout portion so that the tool reaches the fixing portion, or the movable panel is required to be fixed to the panel support member in a state where the panel support member is displaced upward of a vehicle.

A need thus exists for a manufacturing method of a sunroof apparatus which is not susceptible to the drawback mentioned above.

SUMMARY

According to an aspect of this disclosure, a manufacturing method of a sunroof apparatus, the sunroof apparatus includes a movable panel configured to move between a closing position where a roof opening portion is closed and an opening position where the roof opening portion is opened; a panel drive unit including a first guide rail arranged at each end portion of the roof opening portion in a vehicle width direction and extending in a vehicle front-rear direction, a first moving portion configured to move along the first guide rail, and a panel support member connected to the movable panel and configured to displace the movable panel to open and close the roof opening portion in accordance with a movement of the first moving portion in the vehicle front-rear direction; and a shade unit including a second guide rail arranged inward relative to the first guide rail in the vehicle width direction and extending in the vehicle front-rear direction, a second moving portion configured to move along the second guide rail, and a shade configured to move between an extended position and a retracted position in response to a movement of the second moving portion in the vehicle front-rear direction, the extended position where the shade is extended between the movable panel arranged at the closing position and a vehicle compartment, the retracted position where the shade is retracted from between the movable panel arranged at the closing position and the vehicle compartment. The first guide rail and the second guide rail are separately provided. The manufacturing method of the sunroof apparatus includes a first process connecting the movable panel to the panel support member, and a second process connecting the first guide rail and the second guide rail to the movable panel after the first process.

BRIEF DESCRIPTION OF THE DRAWINGS

The foregoing and additional features and characteristics of this disclosure will become more apparent from the following detailed description considered with the reference to the accompanying drawings, wherein:

FIG. 6A is a perspective view of a panel drive unit;

FIG. 6B is an end view of a first guide rail and a slide rail of the panel drive unit;

FIG. 7A is a perspective view of a shade unit;

FIG. 7B is an end view of a second guide rail and a front frame of the shade unit;

DETAILED DESCRIPTION

An embodiment of a sunroof apparatus will hereunder be explained with reference to the drawings. A vehicle width direction, a vehicle front-rear direction, and a vehicle upper-lower direction are employed for the explanation in a state where the sunroof apparatus is mounted on a vehicle.

Figure 1:
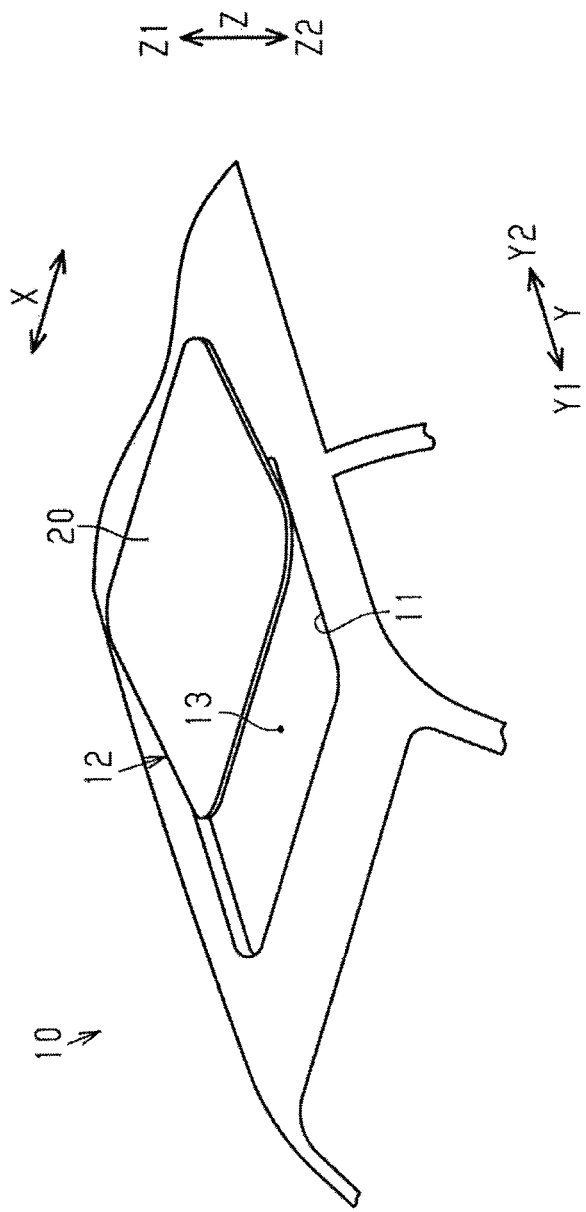
FIG. 1 is a view schematically illustrating a vehicle including a sunroof apparatus of an embodiment disclosed here.

As illustrated in FIG. 1, a vehicle 10 includes a sunroof apparatus 12 opening and closing a roof opening portion 11. The roof opening portion 11 is formed in a substantially quadrilateral shape when seen in a plan view in a vehicle upper-lower direction Z. A vehicle width direction X serves as a longitudinal direction, and a vehicle front-rear direction Y serves as a lateral direction.

Figure 2:
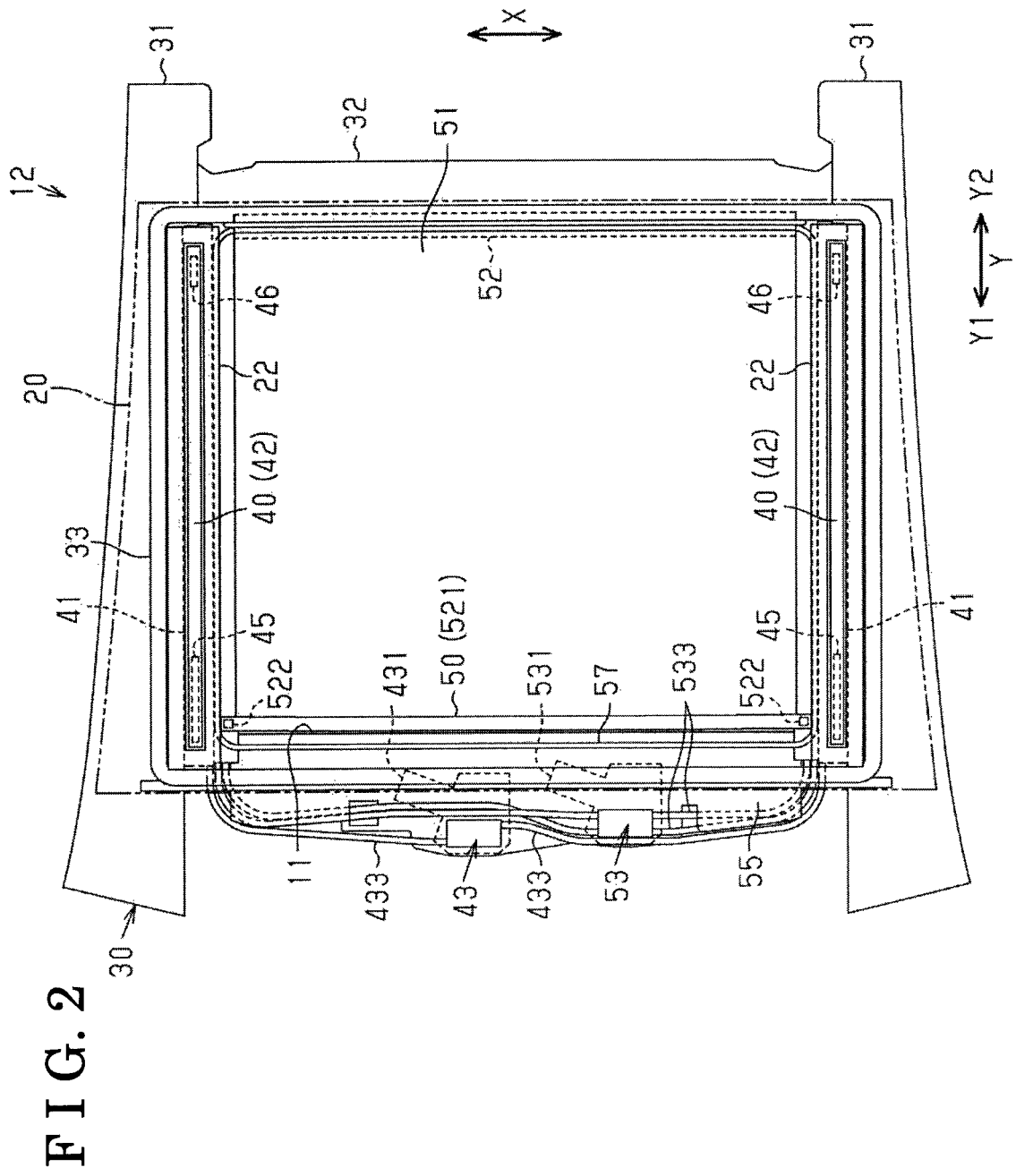
FIG. 2 is a plan view of the sunroof apparatus when a movable panel is disposed at a closing position.
Figure 3:
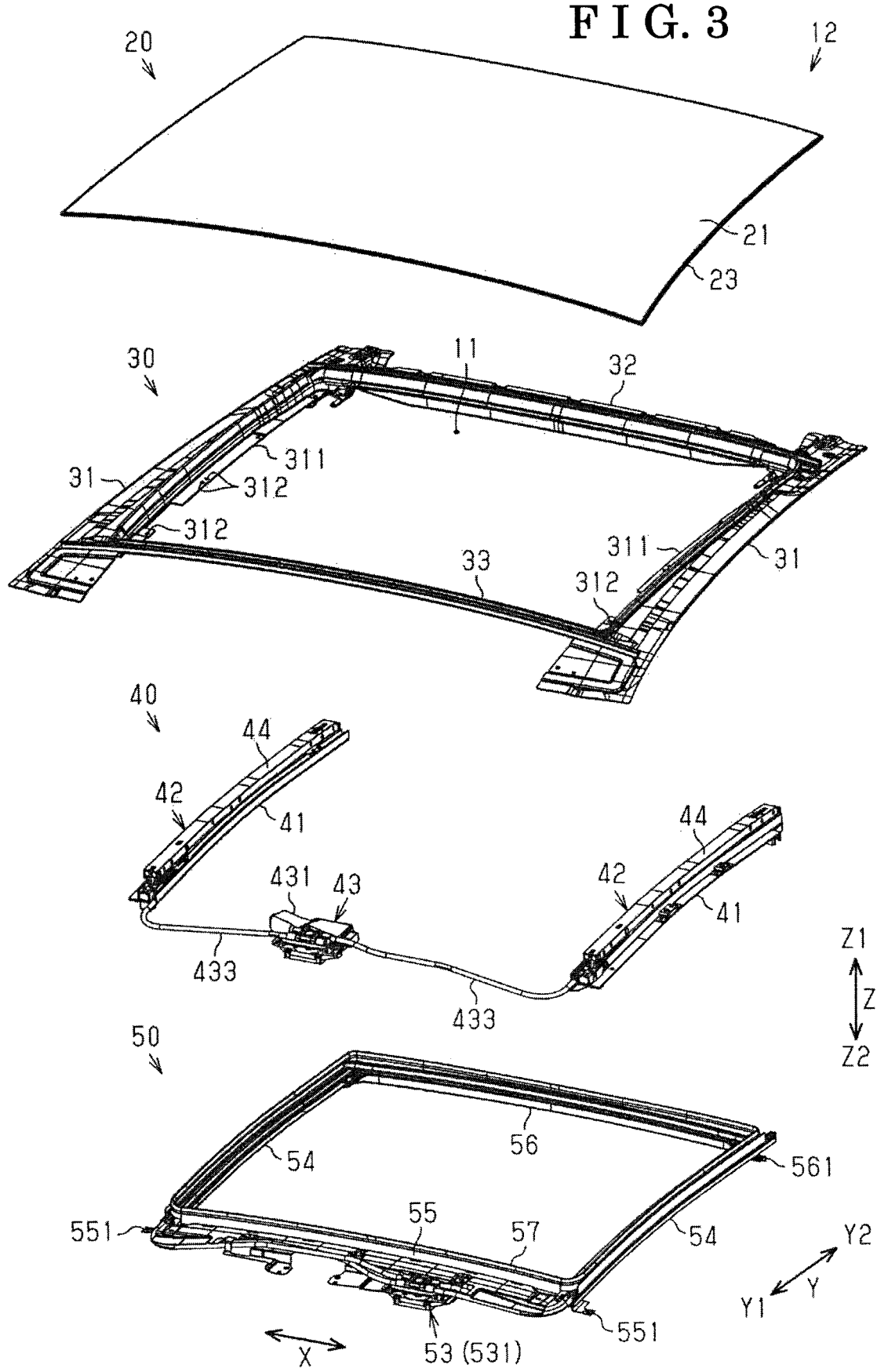
FIG. 3 is an exploded perspective view of the sunroof apparatus.

As illustrated in FIGS. 2 and 3, the sunroof apparatus 12 includes a movable panel 20, a base frame 30, a panel drive unit 40, and a shade unit 50. The movable panel 20 opens and closes the roof opening portion 11. The base frame 30 includes the roof opening portion 11. The panel drive unit 40 drives the movable panel 20. The shade unit 50 blocks light entering into a vehicle compartment 13 via the roof opening portion 11.

Figure 4:
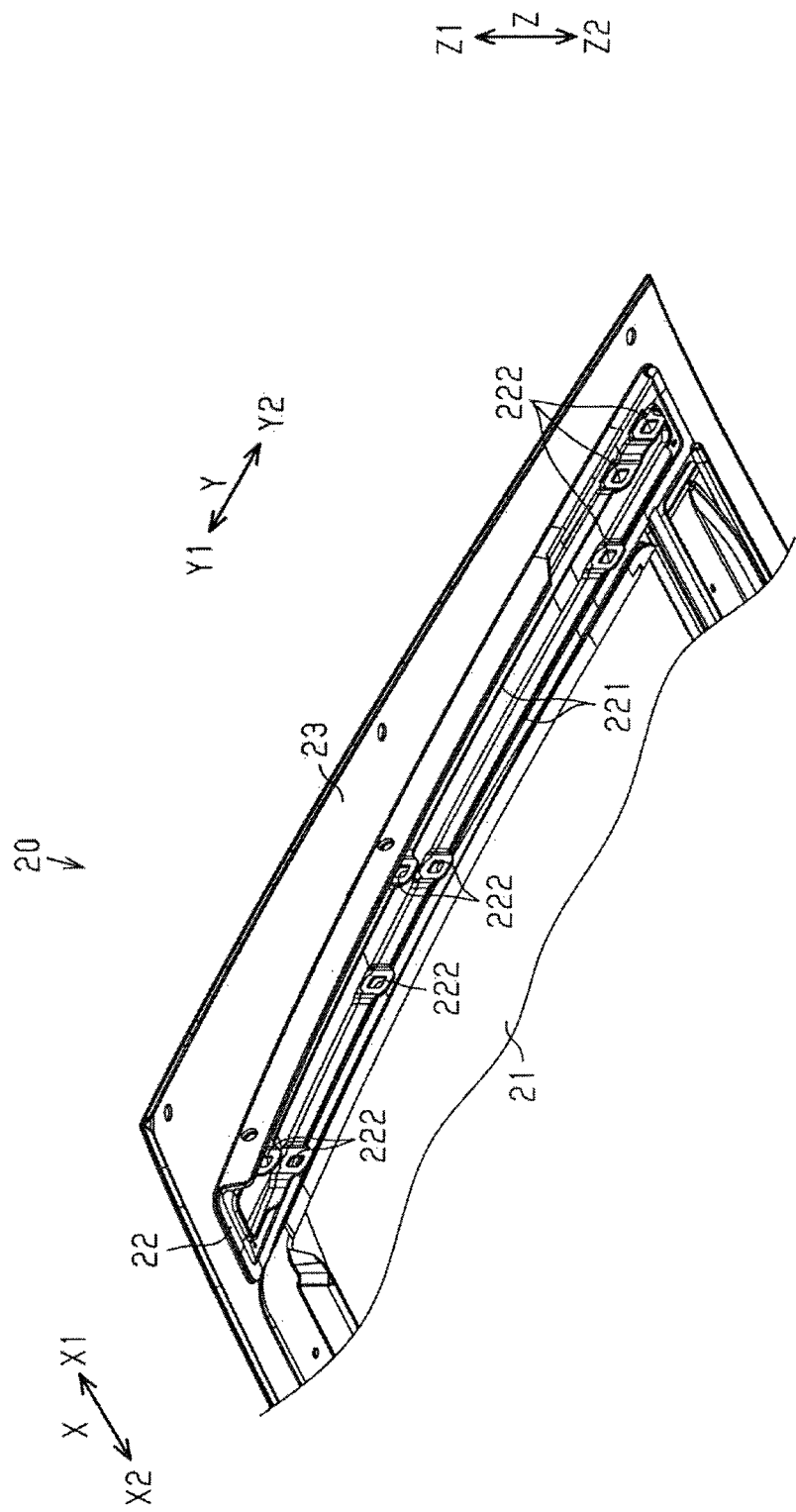
FIG. 4 is a perspective view of the movable panel when seen from downward of a vehicle.

As illustrated in FIG. 4, the movable panel 20 includes a glass panel 21, panel brackets 22, and a resin frame 23. The glass panel 21 includes translucency. The panel brackets 22 extend in the vehicle front-rear direction Y at both end portions of the glass panel 21 in the vehicle width direction X. The resin frame 23 bonds the glass panel 21 to the panel brackets 22.

A translucent panel made of translucent resin may be substituted for the glass panel 21. The panel bracket 22 includes a longitudinal flange 221 extending in a plate thickness direction of the glass panel 21. The longitudinal flange 221 includes plural fixation holes 222 which pass through the longitudinal flange 221 in the vehicle width direction so as to be spaced apart from one another in the vehicle front-rear direction Y. The resin frame 23 is provided between the glass panel 21 and the panel bracket 22. The resin frame 23 includes a shape which is larger than the glass panel 21 when seen in a plan view in the vehicle upper-lower direction Z. The resin frame 23 covers end portions of the glass panel 21 so as to protect the glass panel 21.

Figure 5:
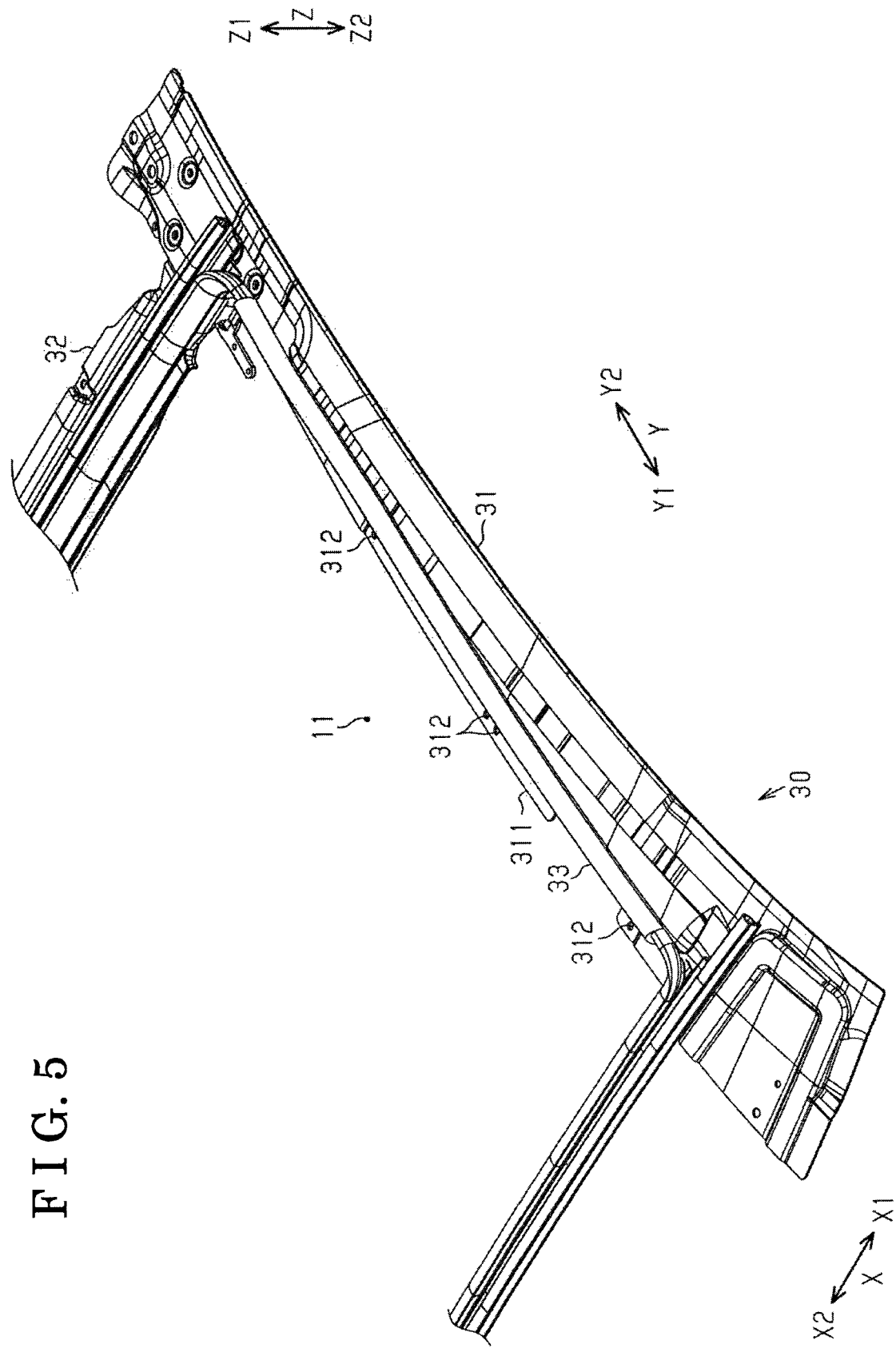
FIG. 5 is a perspective view of a base frame.

As illustrated in FIGS. 3 and 5, the base frame 30 includes side frames 31, a connection frame 32, and an outer weather strip 33. The side frames 31 extend in the vehicle front-rear direction Y. The connection frame 32 connects respective rear end portions of the side frames 31 with each other. The outer weather strip 33 is formed in a frame shape.

The side frames 31 each includes a lateral flange 311 extending an inward direction X2 of the vehicle width direction X. The lateral flange 311 includes plural fixation holes 312 which pass therethrough in the vehicle upper-lower direction Z so as to be spaced apart from one another in the vehicle front-rear direction Y. The side frames 31 each defines an end portion of the roof opening portion 11 in the vehicle width direction X, and the connection frame 32 defines a rear end of the roof opening portion 11. The outer weather strip 33 is a member for inhibiting moisture, for example, rain from entering into the vehicle compartment 13 from a clearance between the movable panel 20 and the roof opening portion 11. The outer weather strip 33 is attached to the side frames 31 and the connection frame 32 so as to rim the roof opening portion 11.

As illustrated in FIGS. 3 and 6A, the panel drive unit 40 includes first guide rails 41, functional components 42, and a first actuator 43. The first guide rails 41 extend in the vehicle front-rear direction Y at the both end portions of the roof opening portion 11 in the vehicle width direction X. The functional components 42 connect the movable panel 20 and the first guide rails 41 with each other. The first actuator 43 drives the functional components 42.

As illustrated in FIG. 6B, the first guide rail 41 includes a bottom wall 411 extending in the vehicle width direction X, a pair of first side walls 412 and a pair of second side walls 413 extending in a vehicle upper direction Z1 from the bottom wall 411. The first guide rail 41 includes a first accommodating groove 414 which is surrounded by the bottom wall 411 and the pair of first side walls 412, and a second accommodating groove 415 which is surrounded by the bottom wall 411 and the pair of second side walls 413. The first accommodating groove 414 serves as a space for accommodating a part of a front support mechanism 45 and a rear support mechanism 46 of the functional component 42. The second accommodating groove 415 serves as a space for accommodating a first transmission cable 432 of the first actuator 43.

As illustrated in FIG. 6B, the bottom wall 411 includes a first fixation hole 416 which passes therethrough in the vehicle upper-lower direction Z and which communicates with the first accommodating groove 414. The bottom wall 411 further includes second fixation holes 417 which pass therethrough in the vehicle upper-lower direction Z in an outward direction X1 of the vehicle width direction X relative to the first fixation hole 416. As illustrated in FIG. 6A, the second fixation holes 417 are formed so as to be spaced apart with one another in the vehicle front-rear direction Y.

As illustrated in FIG. 6A, the functional component 42 includes a slide rail 44 serving as an example of a panel support member supporting the movable panel 20, and the front support mechanism 45 and the rear support mechanism 46 supporting the slide rail 44.

As illustrated in FIG. 6B, the slide rail 44 includes an upper wall 441, a first side wall 442 extending in the inward direction X2 of the vehicle width direction X after extending in a vehicle lower direction Z2 from the upper wall 441, and a second side wall 443 extending in the outward direction X1 of the vehicle width direction X after extending in the vehicle lower direction Z2 from the upper wall 441. The slide rail 44 includes an accommodating groove 444 surrounded by the upper wall 441, the first side wall 442, and the second side wall 443. The accommodating groove 444 corresponds to a space where a part of the front support mechanism 45 and the rear support mechanism 46 are accommodated. The first side wall 442 and the second side wall 443 of the slide rail 44 include plural fixing holes 445 passing through in the vehicle width direction X so as to be spaced apart from each other in the longitudinal direction.

As illustrated in FIG. 6A, the front support mechanism 45 includes a front link 451 supporting a front end portion of the slide rail 44, and a front shoe 452 driving the front link 451 by moving along the first guide rail 41. The front link 451 moves in the vehicle front-rear direction Y in response to the movement of the front shoe 452 in the vehicle front-rear direction Y.

The rear support mechanism 46 includes a rear link 461 supporting the slide rail 44, and a rear shoe 462 driving the rear link 461 by moving along the first guide rail 41. The rear link 461 rotates about a rotary axis extending in the vehicle width direction X in response to the movement of the rear shoe 462 in the vehicle front-rear direction Y. As such, the rear link 461 moves a rear end portion of the slide rail 44 in the vehicle upper direction Z1 and in the vehicle lower direction Z2.

In a case where the front shoe 452 of the front support mechanism 45 moves in the vehicle front-rear direction Y in a state where the rear support mechanism 46 moves the rear end portion of the slide rail 44 in the vehicle upper direction Z1, the slide rail 44 moves in the vehicle front-rear direction Y together with the front link 451. Here, the rear link 461 maintains the positional relationship relative to the first guide rail 41 and continues to support the slide rail 44 moving in the vehicle front-rear direction Y. In the embodiment, the front shoe 452 and the rear shoe 462 each serves as an example of a first moving portion.

As illustrated in FIGS. 3 and 6A, the first actuator 43 includes a first electric motor 431, the first transmission cable 432 and a first cable guide 433. The first transmission cable 432 moves in an extending direction and in a retracting direction by a power of the first electric motor 431. The first cable guide 433 guides the extending and retracting movement of the first transmission cable 432. The first transmission cable 432 is connected to the front support mechanism 45 and the rear support mechanism 46. The first transmission cable 432 serves as a power transmission member for transmitting force in a push-pull direction to the front support mechanism 45 and the rear support mechanism 46.

As illustrated in FIGS. 3 and 7A, a shade unit 50 serves as an example of a shade, and includes a roll shade 52 and a second actuator 53. The roll shade 52 winds up (retracts) and extends a shade sheet 51. The second actuator 53 drives the roll shade 52. The shade unit 50 includes second guide rails 54, a front frame 55, and a rear frame 56. Second guide rails 54 extend in the vehicle front-rear direction Y at both end portions of the roof opening portion 11 in the vehicle width direction X. The front frame 55 connects front ends of the second guide rails 54. The rear frame 56 connects rear ends of the second guide rails 54. The shade unit 50 further includes an inner weather strip 57 mounted on the second guide rails 54, the front frame 55 and the rear frame 56.

The roll shade 52 includes an operating member 521, drive shoes 522, and a rotation member 523. The operating member 521 extends in the vehicle width direction X at a distal end of the shade sheet 51. The drive shoes 522 are fixed at both end portions of the operating member 521 in the longitudinal direction. The rotation member 523 winds up the shade sheet 51.

The shade sheet 51 is formed in a substantial band shape and includes a distal end portion which is fixed to the operating member 521, and a base end portion which is fixed to the rotation member 523. The drive shoes 522 each is engaged with the second guide rail 54 so as to be slidable therewith. In this respect, the drive shoes 522 each serves as an example of a second moving portion moving along the second guide rail 54. Both end portions of the rotation member 523 in an axial direction are rotatably supported at the second guide rails 54. It is favorable that the rotation member 523 is biased by, for example, a spring in a winding direction of the shade sheet 51.

The second actuator 53 includes a second electric motor 531, a second transmission cable 532, and a second cable guide 533. The second transmission cable 532 moves in the extended and retracting direction by the power of the second electric motor 531. The second cable guide 533 guides the extending and retracting movement of the second transmission cable 532. The second transmission cable 532 is connected to the drive shoe 522. The second transmission cable 532 serves as a power transmission member for transmitting force in the push-pull direction to the drive shoe 522.

As illustrated in FIG. 7B, the second guide rail 54 includes a bottom wall 541 extending in the vehicle width direction X, a first side wall 542 extending in the vehicle upper direction Z1 from the bottom wall 541, and a second side wall 543 extending in the vehicle upper direction Z1 by being divided from the first side wall 542. The second guide rail 54 includes a third side wall 544 and a fourth side wall 545. The third side wall 544 extends in the vehicle inward direction X2 of the vehicle width direction X after extending in the vehicle upper direction Z1 from the bottom wall 541. The fourth side wall 545 extends in the vehicle inner direction X2 of the vehicle width direction X after being divided from the third side wall 544.

The second guide rail 54 includes first accommodating grooves 546, a second accommodating groove 547, and a third accommodating groove 548. The first accommodating grooves 546 are surrounded by the bottom wall 541, the first side wall 542 and the third side wall 544. The second accommodating groove 547 is surrounded by the first side wall 542 and the second side wall 542. The third accommodating groove 548 is surrounded by the third side wall 544 and the fourth side wall 545. The first accommodating groove 546 serves as a space where the second transmission cable 532 of the second actuator 53 is accommodated. The second accommodating groove 547 serves as a space where the inner weather strip 57 is assembled. The third accommodating groove 548 serves as a space where an end portion of the shade sheet 51 in the vehicle width direction X are accommodated. As illustrated in FIG. 3, the second guide rails 54 are provided separately from the first guide rails 41.

As illustrated in FIG. 3, the front frame 55 defines the front end of the roof opening portion 11. The front frame 55 is fixed with the first and second electric motors 431, 531 of the first actuator 43 and the second actuator 53, respectively. As illustrated in FIG. 7A, the front frame 55 includes fixing brackets 551 at both end portions thereof in the vehicle width direction X. The fixing bracket 551 extends in the vehicle outer direction X1 of the vehicle width direction X so as to protrude from the second guide rail 54. A fixing hole 552 passes through the fixing bracket 551 in the vehicle upper lower direction Z.

As illustrated in FIG. 7A, the rear frame 56 includes fixing brackets 561 at both end portions in the vehicle width direction X. The fixing bracket 561 extends in the vehicle outer direction X1 of the vehicle width direction X so as to protrude from the second guide rail 54. A fixing hole 562 passes through the fixing bracket 561 in the vehicle upper-lower direction Z.

The inner weather strip 57, as in the case of the outer weather strip 33, is a member for inhibiting moisture, for example, rain from entering into the vehicle compartment 13 from the clearance between the movable panel 20 and the roof opening portion 11. The inner weather strip 57 is smaller than the outer weather strip 33 when seen in a plan view in the vehicle upper-lower direction Z. The inner weather strip 57 is attached to the second guide rail 54, the front frame 55 and the rear frame 56 so as to rim the roof opening portion 11. Specifically, the inner weather strip 57 is attached on the second accommodating groove 547 of the second guide rail 54.

Figure 8:
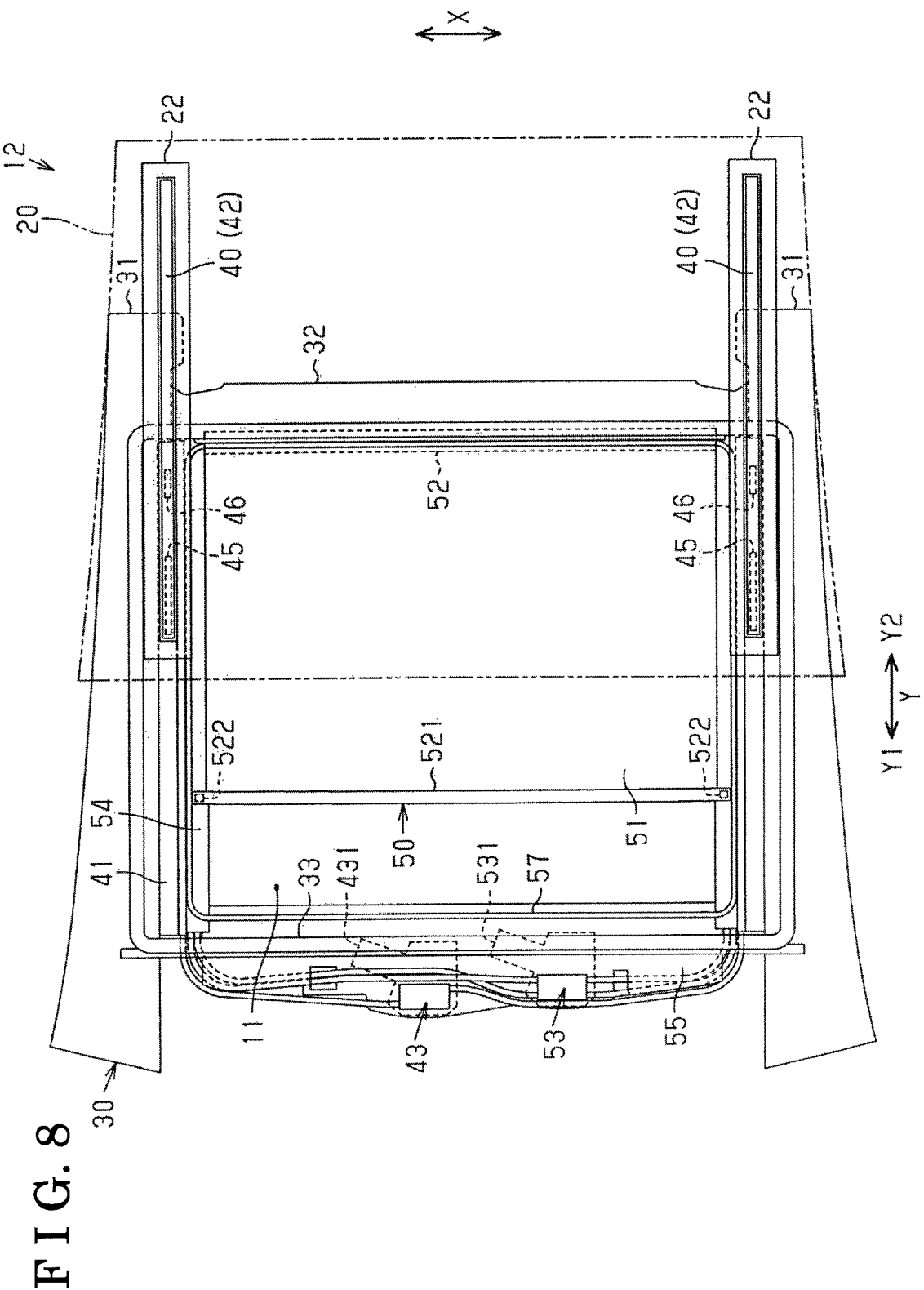
FIG. 8 is a plan view of the sunroof apparatus when the movable panel is disposed at the opening position.

The sunroof apparatus 12 includes the movable panel 20, the base panel 30, the panel drive unit 40, and the shade unit 50 which are integrally formed to be attached with one another. As illustrated in FIGS. 2 and 8, the movable panel 20 moves between a closing position and an opening position by moving the slide rail 44 by the operation of the first actuator 43, the closing position where the roof opening portion 11 is closed, and the opening position where the opening portion 11 is opened. For example, the movable panel 20 opens and closes the roof opening portion 11 by a tilt movement moving the rear end portion of the movable panel 20 in the vehicle upper lower direction Z relative to the front end portion, and by a slide movement moving in the vehicle front-rear direction Y.

The shade sheet 51 moves between an extended position and a retracted position by moving the operating member 521 and the drive shoe 522 in the vehicle front-rear direction Y by the operation of the second actuator 53, the extended position where the shade sheet 51 extends to a position between the movable panel 20 arranged at the closing position and the vehicle compartment 13, the retracted position where the shade sheet 51 is retracted from a position between the movable panel 20 arranged at the closing position and the vehicle compartment 13. Specifically, in case of being disposed at the retracted position, the shade sheet 51 is retracted from the rotation member 523 when the drive shoe 522 and the operation member 521 move in the vehicle front direction Y1. As a result, the shade sheet 51 is deployed in the vehicle lower direction Z2 of the roof opening portion 11. In case of being disposed at the extended position, the shade sheet 51 is wound up by the rotation member 523 when the drive shoe 522 and the operation member 521 move in the vehicle rear direction Y2. As a result, the shade sheet 51 is retracted in the vehicle lower direction Z2 from the roof opening portion 11.

Figure 9A:
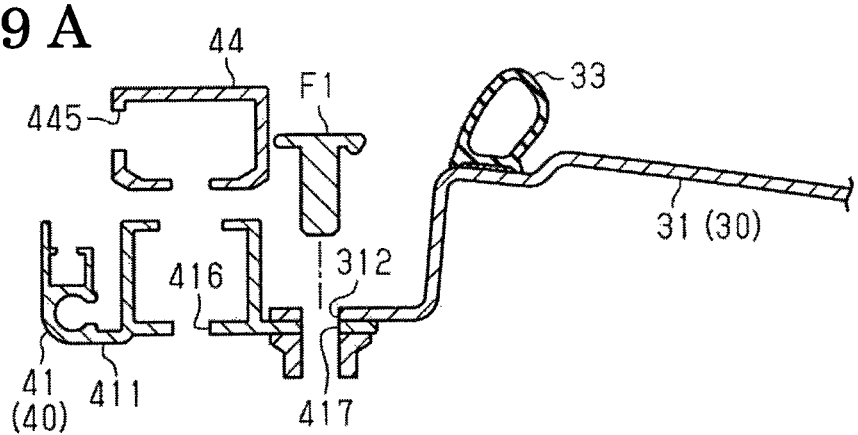
FIG. 9A is an end view showing a state where the sunroof apparatus is assembled.

The manufacturing method of the sunroof apparatus 12 will hereunder be explained with reference to FIG. 9 which is a cross sectional view of the sunroof apparatus 12 at portions seen as the cross sectional views in FIGS. 6B and 7B. First, the panel drive unit 40 is mounted on the base frame 30 for the assembling of the sunroof apparatus 12. Specifically, as illustrated in FIG. 9A, the base frame 30 and the panel drive unit 40 are positioned so that the first guide rail 41 of the panel drive unit 40 is disposed at the side frame 31 of the base frame 30 in the vehicle inner direction X2 of the vehicle width direction X. A fastening member F1 passes through the fixing hole 312 of the side frame 31 of the base frame 30 and the second fixing hole 417 of the first guide rail 41 of the drive unit 40, and the base frame 30 and the panel drive unit 40 are connected with each other (a first assembling process). The outer weather strip 33 shall be mounted on the side frame 31 and the connection frame 32 of the base frame 30 before the first assembling process.

Figure 9B:
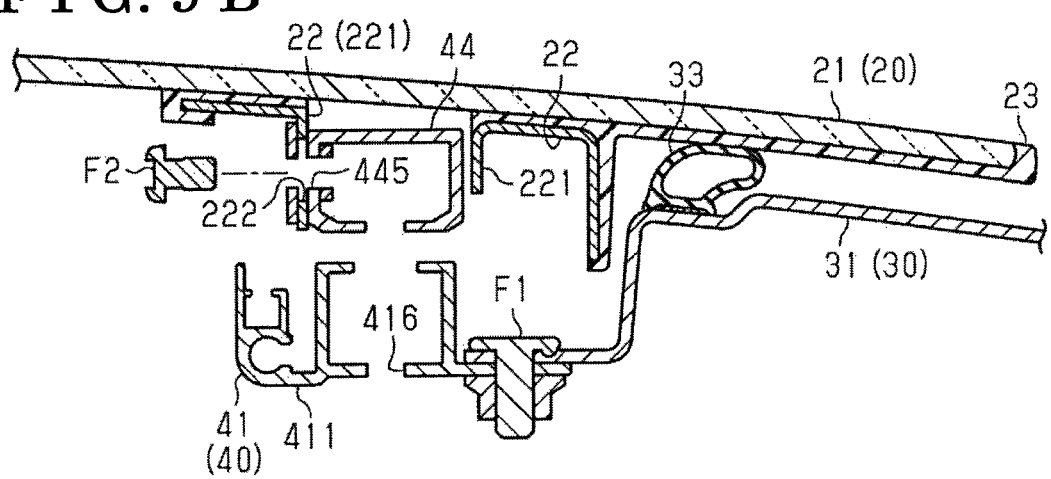
FIG. 9B is another end view showing a state where the sunroof apparatus is assembled.

Next, the panel bracket 22 of the movable panel 20 is mounted on the slide rail 44 of the panel drive unit 40. In particular, as illustrated in FIG. 9B, the panel drive unit 40 and the movable 20 panel are positioned such that the slide rail 44 of the panel drive unit 40 is sandwiched by longitudinal flanges 221 of the panel bracket 22 of the movable panel 20. A fastening member F2 passes through a fixing hole 445 of the slide rail 44 of the panel drive unit 40 and a fixing hole 222 of the panel bracket 22 of the movable panel 20, and the panel drive unit 40 and the movable panel 20 are connected with each other (a second assembling process).

Figure 9C:
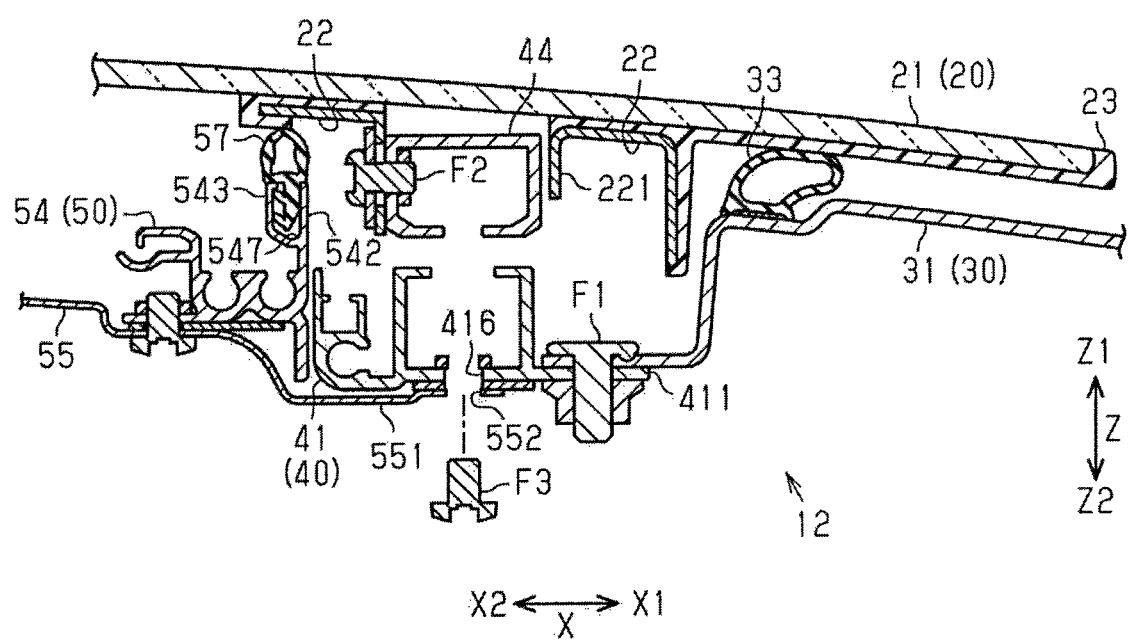
FIG. 9C is still another end view showing a state where the sunroof apparatus is assembled.

Lastly, the second guide rail 54 of the shade unit 50 is mounted on the first guide rail 41 of the panel drive unit 40. In particular, as illustrated in FIG. 9C, the panel drive unit 40 and the shade unit 50 are positioned such that the second guide rail 54 of the shade unit 50 is disposed at the first guide rail 41 of the panel drive unit 40 in the vehicle inner direction X2 of the vehicle width direction X. A fastening member F3 passes through a fixing hole 416 of the first guide rail 41 and the fixing hole 552 of the fixing bracket 551 of the shade unit 50, and the panel drive unit 40 and the shade unit 50 are connected with each other (a third assembling process). The inner weather strip 57 shall be mounted in the second guide rail 54, the front frame 55, and the rear frame 56 of the shade unit 50 before the third assembling process.

As such, the sunroof apparatus 12 is manufactured. The base frame 30 is mounted with the movable panel 20, the panel drive unit 40 and the shade unit 50 with the same process at parts not shown in FIG. 9. In the embodiment, the second assembling process corresponds to a first process, and the third assembling process corresponds to a second process.

Next, the manufacturing method of a sunroof apparatus 12A of a comparison example having the first guide rail 41 and the second guide rail 54 which are integrally provided will hereunder be explained with reference to FIG. 10. A unit of the sunroof apparatus 12A of the comparison example in which the panel drive unit 40 and the shade unit 50 are integrally provided is also referred to as an opening and closing unit 60. That is, in an opening and closing unit 60, the first guide rail 41 and the second guide rail 54 are integrally provided.

Figure 10:
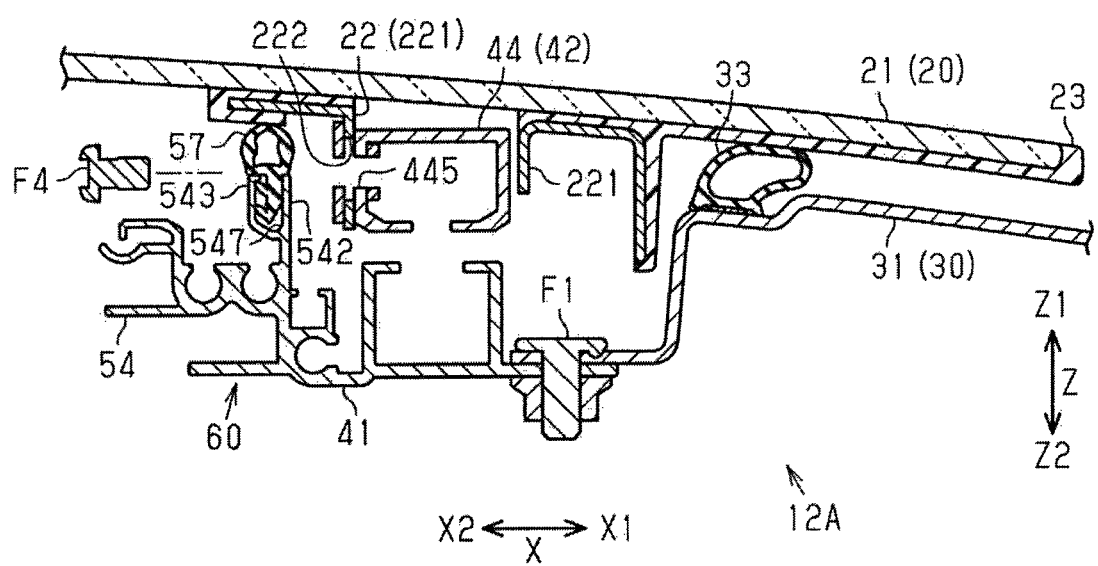
FIG. 10 is an end view showing a state where a sunroof apparatus of a comparison example is assembled.

As illustrated in FIG. 10, the opening and closing unit 60 is mounted on the base frame 30 for assembling the sunroof device 12A of the comparison example. Then, the movable panel 20 is mounted on the opening and closing unit 60. Here, in a case where the panel bracket 22 of the movable panel 20 is mounted on the slide rail 44 of the opening and closing unit 60, a fastening member F4 interferes with the first side wall 542 and the second side wall 543 of the second guide rail 54.

Accordingly, the manufacturing method of the sunroof apparatus 12A of the comparison example is required to adjust the position of the functional component 42 such that the fixing hole 445 of the slide rail 44 and the fixing hole 222 of the panel bracket 22 of the movable panel 20 are disposed on the first side wall 542 and the second side wall 543 of the second guide rail 54 in the vehicle upper direction Z1 when the movable panel 20 is assembled. The manufacturing method of the sunroof panel 12A of the comparison example is required to include a cutout at the first side wall 542 and the second side wall 543 of the second guide rail 54 such that the fixing hole 445 of the slide rail 44 and the fixing hole 222 of the panel bracket 22 of the movable panel 20 are exposed in the vehicle inner direction X2 of the vehicle width direction X when the movable panel 20 is assembled.

In this respect, in the manufacturing method of the sunroof apparatus 12A of the comparison example, the inner weather strip 57 cannot be mounted on the second guide rail 54 before mounting of the movable panel 20 to the opening and closing unit 60. That is, in the manufacturing method of the sunroof apparatus 12A of the comparison example, only after the movable panel 20 is mounted on the opening and closing unit 60, the weather strip 57 can be mounted on the second guide rail 54. In addition, in a case where the inner weather strip 57 is mounted on the second guide rail 54, the movable panel 20 is required to be opened up to a position where the second accommodating groove 547 is exposed.

Effects and advantages of the embodiment will hereunder be explained.

In the manufacturing method of the sunroof apparatus 12 of the embodiment, the movable panel 20 is connected to the slide rail 44, and after the movable panel 20 and the panel drive unit 40 are integrally provided with each other, the first guide rail 41 and the second guide rail 54 are connected with each other. Accordingly, the movable panel 20, the panel drive unit 40 and the shade unit 50 are integrally provided with one another. Thus, according to the aforementioned manufacturing method, the movable panel 20 does not have to be fixed at the slide rail 44 in a state where the first guide rail 41 and the second guide rail 54 are connected with each other. That is, the second guide rail 54 is not the obstacle when the movable panel 20 is fixed on the slide rail 44 regardless of the shape of the second guide rail 54. In particular, the first side wall 542 and the second side wall 543 of the second guide rail 54 serving as the components for attaching the inner weather strip 57 are not obstacles when the movable panel 20 is fixed on the slide rail 44. As such, the aforementioned manufacturing method may inhibit the manufacturing process of the sunroof apparatus 12 from being complicated.

In the manufacturing method of the sunroof apparatus 12 of the embodiment, the inner weather strip 57 may be mounted on the shade unit 50 before the panel drive unit 40 and the shade unit 50 are integrally provided. In other words, the mounting of the inner weather strip 57 to the shade unit 50 does not influence on the assembling of the movable panel 20 to the panel drive unit 40. Thus, according to the aforementioned manufacturing method, the burden of the operator may be reduced comparing to a case where the inner weather strip 57 is attached after the panel drive unit 40 and the shade unit 50 are integrated with each other.

The embodiment may be modified as follows. In the embodiment and modified examples of the embodiment described below may be combined to the extent of not being contradicted technically.

The shade unit 50 does not have to be provided with the front frame 55 and the rear frame 56. In this case, it is favorable that the fixing brackets 551, 561 of the front frame 55 and the rear frame 56, respectively, are provided at the first guide rail 41 or the second guide rail 54.

The base frame 30 and the panel drive unit 40 may be integrally provided with each other in advance.

The second guide rail 54 may be provided with a cutout portion at portions of the first side wall 542 and the second side wall 543, respectively, the portions opposing the fixing hole 445 of the slide rail 44 in a case where the movable panel 20 is disposed in the closing position. Accordingly, the operator may easily operate maintenance in accordance with a detachment of the movable panel 20 after the sunroof apparatus 12 is assembled.

The sunroof apparatus 12 may not include the outer weather strip 33 and the inner weather strip 57. In this case, an assembling process of the outer weather strip 33 and the inner weather strip 57 of the manufacturing method of the sunroof apparatus 12 may be omitted.

In the shade unit 50, a plate-shaped shading board may be employed as the shade sheet 51. In this case, the shading board may correspond to an example of a shade.

The sunroof apparatus 12 of the embodiment employs an outer slide type in which the movable panel 20 arranged at the opening position is disposed at a roof in the vehicle upper direction Z1. Alternatively, the sunroof apparatus 12 may employ an inner slide type in which the movable panel 20 arranged at the opening position is retracted in a space between the roof and the vehicle compartment 13.

According to the aforementioned embodiment, the manufacturing method of a sunroof apparatus (12), the sunroof apparatus (12) includes the movable panel (20) configured to move between the closing position where the roof opening portion (11) is closed and the opening position where the roof opening portion (11) is opened; the panel drive unit (40) including the first guide rail (41) arranged at each end portion of the roof opening portion (11) in the vehicle width direction and extending in the vehicle front-rear direction; the first moving portion (the front shoe 452, the rear shoe 462) configured to move along the first guide rail (41); and the panel support member (the slide rail 44) connected to the movable panel (20) and configured to displace the movable panel (20) to open and close the roof opening portion (11) in accordance with the movement of the first moving portion (the front shoe 452, the rear shoe 462) in the vehicle front-rear direction; and the shade unit (50) including the second guide rail (54) arranged inward relative to the first guide rail (41) in the vehicle width direction and extending in the vehicle front-rear direction, the second moving portion (the drive shoe 522) configured to move along the second guide rail (54); and the shade (50) configured to move between an extended position and a retracted position in response to a movement of the second moving portion (the drive shoe 522) in the vehicle front-rear direction, the extended position where the shade (50) is extended between the movable panel (20) arranged at the closing position and the vehicle compartment (13), the retracted position where the shade (50) is retracted from between the movable panel (20) arranged at the closing position and the vehicle compartment (13). The first guide rail (41) and the second guide rail (54) are separately provided. The manufacturing method of the sunroof apparatus (12) includes the first process connecting the movable panel (20) to the panel support member (the slide rail 44), and the second process connecting the first guide rail (41) and the second guide rail (54) to the movable panel (20) after the first process.

According to the aforementioned manufacturing method, the movable panel 20 is connected to the slide rail 44, and after the movable panel 20 and the panel drive unit 40 are integrally provided with each other, the first guide rail 41 and the second guide rail 54 are connected with each other. Accordingly, the movable panel 20, the panel drive unit 40 and the shade unit 50 are integrally provided with one another. Thus, according to the aforementioned manufacturing method, the movable panel 20 does not have to be fixed at the slide rail 44 in a state where the first guide rail 41 and the second guide rail 54 are connected with each other. That is, the second guide rail 54 is not the obstacle when the movable panel 20 is fixed on the slide rail 44 regardless of the shape of the second guide rail 54. As such, the aforementioned manufacturing method may inhibit the manufacturing process of the sunroof apparatus 12 from being complicated from a point of view in which the movable panel is easily connected to the panel support member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A manufacturing method of a sunroof apparatus, the sunroof apparatus comprising:

a movable panel configured to move between a closing position where a roof opening portion is closed and an opening position where the roof opening portion is opened;

a panel drive unit including
  a first guide rail arranged at each end portion of the roof opening portion in a vehicle width direction and extending in a vehicle front-rear direction;
  a first moving portion configured to move along the first guide rail; and
  a panel support member connected to the movable panel and configured to displace the movable panel to open and close the roof opening portion in accordance with a movement of the first moving portion in the vehicle front-rear direction; and a shade unit including
  a second guide rail arranged inward relative to the first guide rail in the vehicle width direction and extending in the vehicle front-rear direction,
  a second moving portion configured to move along the second guide rail; and
  a shade configured to move between an extended position and a retracted position in response to a movement of the second moving portion in the vehicle front-rear direction, the extended position where the shade is extended between the movable panel arranged at the closing position and a vehicle compartment, the retracted position where the shade is retracted from between the movable panel arranged at the closing position and the vehicle compartment;

the first guide rail and the second guide rail are separately provided; and the manufacturing method of the sunroof apparatus, comprising;

a first process connecting the movable panel to the panel support member; and a second process connecting the first guide rail and the second guide rail to the movable panel after the first process.

* * * * *